United States Patent
Kennedy et al.

(10) Patent No.: US 9,868,649 B2
(45) Date of Patent: Jan. 16, 2018

(54) PROCESS AND APPARATUS FOR PURIFYING WATER

(75) Inventors: William Peter Keith Kennedy, Duffy (AU); Andrew James Hermann, Mawson (AU); Thomas Andrew Wood, San Diego, CA (US)

(73) Assignee: Nexus eWater Pty Ltd., Fyshwick (AU)

( * ) Notice: Subject to any disclaimer, the term of this patent is extended or adjusted under 35 U.S.C. 154(b) by 842 days.

(21) Appl. No.: 13/805,571

(22) PCT Filed: Jun. 24, 2011

(86) PCT No.: PCT/AU2011/000777
§ 371 (c)(1),
(2), (4) Date: Aug. 14, 2013

(87) PCT Pub. No.: WO2011/160185
PCT Pub. Date: Dec. 29, 2011

(65) Prior Publication Data
US 2013/0319947 A1 Dec. 5, 2013

(30) Foreign Application Priority Data
Jun. 25, 2010 (AU) .................................. 2010902814

(51) Int. Cl.
*C02F 1/24* (2006.01)
*B01D 17/02* (2006.01)
(Continued)

(52) U.S. Cl.
CPC ............ *C02F 1/24* (2013.01); *B01D 17/0205* (2013.01); *C02F 1/004* (2013.01); *C02F 1/32* (2013.01);
(Continued)

(58) Field of Classification Search
None
See application file for complete search history.

(56) References Cited

U.S. PATENT DOCUMENTS 4,834,872 A * 5/1989 Overath ................. A01K 63/04
210/151
5,385,665 A * 1/1995 Neuhaus ................. A01K 63/04
119/261
(Continued)

FOREIGN PATENT DOCUMENTS

CA 2140305 A1 * 7/1996
DE 19505297 A1 * 8/1996
(Continued)

OTHER PUBLICATIONS

International Search Report and Written Opinion in co-pending related PCT Application No. PCT/AU2011/000777, dated Jun. 24, 2011.

*Primary Examiner* — Thomas M Lithgow
(74) *Attorney, Agent, or Firm* — Finnegan, Henderson, Farabow, Garrett & Dunner L.L.P.

(57) ABSTRACT

The invention relates to a process and apparatus that treats waste water, in particular waste water containing surfactants and including grey water, for local reuse. According to the invention, the process comprises a) collecting waste water in a reservoir; b) injecting gas into waste water from the reservoir to form bubbles in the waste water; c) separating the bubbles, and any entrained contaminants, from the waste water; d) drying the separated bubbles and returning any water recovered from the dried bubbles to the waste water undergoing treatment; e) optionally repeating steps b) to d) to achieve the desired purification of the waste water; and f) collecting the purified waste water. The invention provides a robust process and a mechanically simple apparatus that does not require regular replacement of chemicals or filters, yet is capable of treating waste water locally, and in particular grey water for household reuse.

20 Claims, 4 Drawing Sheets

(51) Int. Cl.
  *C02F 1/00* (2006.01)
  *C02F 1/32* (2006.01)
  *C02F 1/78* (2006.01)
  *C02F 103/00* (2006.01)

(52) U.S. Cl.
  CPC .......... *C02F 1/78* (2013.01); *C02F 2103/002* (2013.01); *C02F 2209/38* (2013.01); *C02F 2209/40* (2013.01)

(56) References Cited

U.S. PATENT DOCUMENTS

| | | | | |
|---|---|---|---|---|
| 5,665,227 | A * | 9/1997 | Watt | A01K 63/04 210/167.26 |
| 5,736,034 | A * | 4/1998 | Phillips | A01K 63/04 210/167.26 |
| 6,254,771 | B1 * | 7/2001 | Iwashita | B01D 47/06 209/168 |
| 2013/0319947 | A1 * | 12/2013 | Kennedy | B01D 17/0205 210/665 |

FOREIGN PATENT DOCUMENTS

| | | | |
|---|---|---|---|
| DE | 19916192 C1 | * | 10/2000 |
| GB | 955321 | * | 4/1964 |
| JP | 49-076337 A | | 7/1974 |
| JP | 59-069109 A | * | 10/1982 |
| JP | 59-069109 A | | 4/1984 |
| JP | 6-226248 A | | 8/1994 |

* cited by examiner

PROCESS AND APPARATUS FOR PURIFYING WATER

CROSS-REFERENCE TO RELATED APPLICATION

This application is the 35 U.S.C. §371 national stage of, and claims priority to and the benefit of, PCT application PCT/AU2011000777, filed Jun. 24, 2011, which claims priority to and the benefit of Australian Application No. 2010902814, filed on Jun. 25, 2010, herein incorporated by reference in its entirety.

FIELD OF THE INVENTION

The present invention relates to a process and apparatus that treats waste water, in particular grey water; for local reuse. For example, in a particularly preferred embodiment, domestic grey water can he treated according to the invention enabling the residents to make optimal use of scarce, high quality water resources.

BACKGROUND OF THE INVENTION

Fresh water is becoming a limiting resource as a result of human activity. We are both consuming more, due to our increasing population, and simultaneously reducing availability, due to pollution and the anthropogenic contribution to climate change. It is imperative that we develop strategies to utilise water resources more efficiently.

In a domestic environment people use water for drinking, cooking, washing, sanitation and irrigation. This water comes from many sources including rainwater tanks, wells, lakes, rivers and streams. It is often polished to remove contaminants. In many countries this water is supplied through centralised municipal systems where the water is extensively treated to be suitable for drinking. As these resources increasingly fail to meet demand, sea water and, more recently treated sewage are being utilised to fill the gap.

The supply of a high quality water resource has been a boon for human health, but the large scale transport and treatment of water has generated vast quantities of greenhouse gases, emitted during production of the energy required for these processes, which has amplified the shortage of fresh water.

Less than 2% of the municipal water supplied is used for drinking, so high quality water resources could be spared by supplying lower quality water for irrigation, toilet flushing and laundry. These needs could be met by rainwater or treated waste water. Currently, most of this non-potable water is generated in municipal facilities where sewage (black water) is treated to a standard suitable for non-potable uses. The process of transporting, treating and returning the treated water from large centralised facilities has proved expensive in terms of energy consumption and infrastructure development, so methods have been explored to enable local treatment of the waste water. Local treatment has the added benefit of reducing risks associated with the spread of infectious agents.

The largest portion of domestic waste water, by volume, is produced by washing of people and their clothes and this waste water is often called grey water. By separating these sources from the much more heavily contaminated toilet and kitchen waste it should be possible to develop energy efficient systems that can produce water suitable for toilet flushing, irrigation, laundry and car washing.

At its most basic, such a system would capture domestic grey water, from washing clothes and bathing, and divert it through coarse filtration to subsurface irrigation, where the soils are suitable and rainfall is minimal. The water remains contaminated with infectious agents, so must not come into contact with people or their food. It also contains particulate, like hair and lint, and organic material, which encourages bacterial growth in the filters and the irrigation networks. The accumulated hair and lint together with bacterial growth, causes clogging of filters and the irrigation network: necessitating frequent maintenance and exposure of people to untreated waste water. This basic system does not therefore maximise the reuse potential of the waste water and presents a health risk to those maintaining the systems.

More complex systems have been described that filter and sanitise the grey water, most commonly with chlorine, ozone or ultraviolet light. After this level of treatment the water is suitable for toilet flushing and irrigation, including food crops. However as the water still contains organic material, bacterial growth still occurs in and around the irrigation networks and toilet cisterns. Once again the true potential for reuse of the waste water is not exploited and system maintenance still presents a health risk.

Systems have also been described that treat the grey water to remove the organic material as well as the particulate material and infectious agents. In PCT/AU2008/000213 a combination of flocculation with aluminium sulphate, sanitation with calcium hypochlorite and filtration is used to treat laundry waste to a very high standard. However systems like this, which produce water treated suitable for toilet flushing and irrigation and do not expose the user to infectious agents, require regular addition of chemicals and periodic replacement of filters. This does increase the cost of operation and precludes the use of such systems in developing countries.

Other systems have been described that use biological processes and these can provide high quality water but suffer from three limitations. Firstly, they require a critical mass of viable bacteria to degrade the organic material. As a result they cannot generate treated water immediately upon supply of waste water. Secondly, the bacteria responsible for degrading the organic compounds are sensitive to the presence of biocides in the waste water which in the domestic environment can include hypochlorites, QUATs, hydrogen peroxide, percarbonates, cyclohexidine and stabilised chlorine dioxide. Thirdly, the bacteria responsible for degrading the organic compounds must be removed from the waste water by some form of filtration, which can be difficult to maintain. Generally these systems require the home owner to modify their waste disposal behaviour and follow detailed guidelines on when their treated water is safe fir reuse as there is no easy way for them to know when such a system is fully treating the waste water. To circumvent these problems non-biological treatment steps have been added to these systems such as the use of ozonation in PCT/AU2009/000553, but these systems have proved complex to control, expensive to construct and difficult to maintain, so have not proved popular even in developed nations.

There is therefore a pressing need for a system that ameliorates the problems mentioned above, or at the very least provides an alternative to currently known systems. Such a system would ideally be mechanically simple and not require regular replacement of chemicals or filters, yet be functionally robust and capable of treating waste water locally to improve the efficiency of water use in developed and developing countries.

SUMMARY OF THE INVENTION

The invention resides broadly in a process for purifying waste water containing surfactant impurities, comprising:
 a. collecting waste water in a reservoir;
 b. injecting gas into waste water from the reservoir to form bubbles in the waste water;
 c. separating the bubbles, and any entrained contaminants, from the waste water;
 d. drying the separated bubbles and returning any water recovered from the dried bubbles to the waste water undergoing treatment;
 e. optionally repeating steps b to d to achieve the desired purification of the waste water; and
 f. collecting the purified waste water.

Preferably, the process further comprises one or more of the following steps:
 a. passing the waste water through a filter to remove particles larger than approximately 200 µm;
 b. contacting the purified waste water with an adsorbent: and
 c. contacting the waste water with UV light.

The gas used in the process is typically air, but ozone can be added if desired. Air is preferably injected in proportion to the flow rate of water through the system. For example, an air-to-water ratio between 1:5 and 1:30 can be employed. For the water flow rate required to treat wastewater from a domestic residence, this equates to an air flow rate between 1 and 4 l/minute. Conveniently, ozone can be generated as a by-product of the contact with UV light. for example.

The flow of waste water in the process is non-turbulent, and in fact turbulence is typically unnecessary and detrimental to bubble formation. Bubble distribution preferably should be uniform with an even distribution of bubbles in waste water undergoing treatment. The mixing device is preferably a static mixer to facilitate suitable bubble formation. The separated bubbles are dried by concentration of the bubbles as foam. According to the invention, this is preferably achieved by recirculation of the foam within a drying chamber to facilitate drainage of excess water from the foam.

In another aspect, the invention resides in an apparatus for purifying waste water containing surfactant impurities, comprising the following:
 a. a process reservoir including an inlet for receiving waste water to be treated:
 b. a gas injection device;
 c. a gas and waste water mixing device;
 d. a bubble separator, including an inlet and outlet and a bubble drainage chamber;
 e. conduit connecting the components a to d; and
 f. an outlet for dispensing purified water;
wherein the bubble drainage chamber is configured to dry bubbles separated from waste water undergoing purification and return any water recovered from the bubbles to the waste water undergoing treatment.

The apparatus can further comprise one or more of the following:
 a. a first filter capable of removing particles larger than approximately 200 µm;
 b. an adsorbent contactor;
 c. an ozone generator;
 d. a second filter capable of removing particles larger than approximately 1 µm; and
 e. a reservoir to store treated water.

The bubble separator includes a throat in connection with the upper ceiling of the drainage chamber. Preferably, the throat extends below the ceiling and into the drainage chamber of the bubble separator as in combination with sufficient space within the drainage chamber, this has been found to facilitate recirculation and drainage of foam prior to exiting the drainage chamber via the throat. Preferably, the throat is of smaller cross section when compared with the drainage chamber. The throat to ceiling section diameter is preferably between 1:2 and 1:5, and the height-to-diameter ratio of the drainage chamber is preferably between 1:1 and 3:1. Preferably, waste water enters the separator at a point, so that bubbles/foam do not rise directly into the throat, but rather rise into a ceiling section so that recirculation is encouraged. For example, the waste water inlet of the bubble separator can be at a peripheral edge of the bubble separator and in use bubbles rise adjacent the wall of the bubble separator towards the upper ceiling of the drainage chamber. reflecting off the ceiling and thereby being caused to recirculate before ultimately exiting via the throat. In one embodiment, the bubble separator will comprise:
 a. an inlet for waste water undergoing purification;
 b. an outlet for waste water after purification;
 c. a drainage chamber including a bubble reflector; and
 d. an outlet section.

As mentioned, the drainage chamber is configured to dry and discard to waste foam separated from waste water undergoing purification and return any water recovered from the dried foam to the waste water undergoing treatment. The bubble reflector may take the form of a throat in connection with the upper ceiling of the drainage chamber (as discussed above). The ceiling of the drainage chamber which defines the space between the side wall and the throat of the drainage chamber is in cross section preferably one of the group including: pitched, arcuate, sloping or horizontal The inlet of the bubble separator can be proximal an outer wall of the separator, or substantially coterminous, i.e.: sharing a common wall, with an outer wall of the separator. such that bubbles rising from the waste water do so at the all of the separator as this configuration has been found to enhance bubble recirculation. To assist in the uniform supply of bubbles suitable for recirculation and drainage, it is preferred that waste water flow within the separator is essentially unobstructed by mixing or aerating impediments and hence the waster water within the separator is substantially smooth and non-turbulent. The linear flow rate of waste water exiting the bubble separator is preferably between 0.2 and 2.0 cm/s, most preferably between 0.7 and 1.5 cm/s, such that the bubbles effectively separate from the waste water.

Purified water according to the process or apparatus of the invention is preferably suitable for reuse in flushing toilets, irrigation or laundry. Advantageously, according to the invention loss of water entering the apparatus to waste is below 10 percent, preferably below 2 percent and often less than 1 percent can be achieved.

The process according to the invention is preferably used in the treatment of grey water, including household grey water. "Grey water" is waste water that generally arises from plumbing fixtures not designed to receive human excrement or discharges and is thus not grossly contaminated by faeces or urine. Grey water might also include waste water generated by commercial vehicle, including car or bus washes, commercial laundries, and the like.

Grey water generally contains variable quantities of inorganics (e.g. dissolved salts such as phosphates, nitrates, etc), organics (e.g. oils, greases, soap, toothpaste, shampoo/conditioner, hair dyes, surfactants and cleaning chemicals), physical impurities (e.g. dirt, food, sand, lint. hair, blood, urine, faeces etc) and micro-organisms (e.g. bacteria, viruses, protozoa etc) which arise from household and personal hygiene practices.

In the present application, where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgement or any form of suggestion that the prior art forms part of the common general knowledge in Australia or elsewhere.

BRIEF DESCRIPTION OF DRAWINGS

The invention will now be described in a non-limiting manner with respect to a preferred embodiment in which:

FIG. 3 shows a range of bubble separator throat geometries suitable for use in the invention.

DETAILED DESCRIPTION OF THE INVENTION

The invention resides in an apparatus and process for purifying waste water. For example, in a domestic environment such waste water may include the waste water generated by the washing of people and their clothes. The process may however be suitable for the purification of other sources of waste water, especially those that are high in surfactant and therefore similar in constitution to grey water.

The process in one form may include the steps of coarse filtration of the waste water through a filter into a vessel: aeration of the water to generate a fluid stream containing detergent stabilised bubbles; passage of this fluid stream through a bubble separator, wherein the bubbles are separated from the fluid stream and dried with excess water from the bubbles returned to the fluid stream; irradiation of the bubble free fluid stream with ultraviolet light during return to the vessel; recirculation of the water through these processes until sufficient purification is attained; collection and supply of treated water for supply back into the dwelling, for toilet flushing, irrigation and laundry, for example.

In a more refined embodiment, the process might include one or more of:
(a) passing the waste water through a filter to remove particles greater than about 200 µm. The filter may be a reusable or a disposable filter;
(b) aeration of the water to generate small detergent stabilised bubbles:
(c) separation of the bubbles from the water in a bubble separator, where separation includes:
  1. recirculation and drying of the bubbles in the bubble separator; and
  2. removal of the dried bubbles from the bubble separator:
(d) irradiation of the water with ultraviolet light;
(e) repeating steps (b) to (d) until most organic contaminants and particulates are removed and the water is sterilised;
(f) storage of the treated water; and
(g) supply back into the dwelling.

If the source of grey water is a domestic dwelling, the grey water can be intercepted in a suitably sized pit or sump to decouple the treatment cycle from domestic production. Plumbing can be configured so that excess waste water continues to the sewer once the sump or pit is full. The plumbing exiting the sump or pit can be configured to prevent black water and malodorous gases from entering the pit or sump from the sewer.

Treatment by the process of the invention will ideally be performed in batches of between 50-300 L so that the treatment apparatus is a convenient size for installation inside a dwelling. During transfer of each batch of waste water into the apparatus a coarse screen or filter, most preferably a parabolic wedge wire screen, removes particulate matter larger than approximately 200 µm, such as hair, lint and sand. The performance of the coarse filter is most preferably maintained by periodic washing with a small amount of treated water.

The apparatus of the invention preferably includes a recirculation vessel that is capable of holding a batch of water prior to being treated, and then again after treatment. Treatment continues with the introduction of gas, typically air, into the waste water stream drawn from the base of the recirculation vessel, preferably by means of a venturi. The air entering the waste water forms bubbles which are then sheared into smaller bubbles most preferably by the use of a static mixer. The surfaces of these bubbles become coated in a mono layer of detergent molecules arranged so that their hydrophobic portions generally face the air inside the bubble and their hydrophilic portions generally face the body of water. Most surprisingly organic material and particulate in the grey water also adsorb onto the surface of these bubbles. The waste water and air mixture is then introduced into the bottom of the bubble separator in such a way that the mixture travels rapidly upwards in a tubular or annular section of small cross-sectional area before entering a section with a much larger cross-sectional area. In this section the upward velocity of the water briefly drops to zero at a point set by an overflow arranged outside the separator. The water then descends, under gravity, at a velocity low enough to permit the bubbles to collect on the surface of the water. The bubbles are then pushed upwards away from the body of water by the arrival of more bubbles forming a foam. Again surprisingly this foam carries the organic material and particulate along with detergents and a portion of the waste Water upwards away from the bulk of the waste water.

The design of the bubble separator and the rate at which air is injected encourage water to drain out of the foam as it rises. By selecting the correct geometry for the upper section of the separator, the foam can be drained of water in a space efficient manner by encouraging a recirculative motion within the body of the foam. As a result, largely "dry" foam can be obtained at the top of the vessel where it is directed into a collector and gradually collapses. The collapsed foam containing the detergents and attached organic material and particulate now enters the sewer, or can be collected for reuse, in a small amount of carried over water. Surprisingly less than 1% of the initial water is lost in this process. Moreover, it has been found by the present inventors that recirculating bubbles in the separator reduces the height of the column required to separate essentially dry foam.

Under certain circumstances it is desirable to introduce ozone into the air stream as this modifies the surface properties of the bubbles and oxidises some of the malodorous compounds found in the grey water. However, it is important that this oxidising agent does not reach a concentration where degradation of the detergents can occur as they are necessary for optimal performance of the system.

The water leaving the bubble separator can fall directly back into the recirculation tank or more preferably is passed through a sterilisation process to ensure that all infectious agents are inactivated. The preferred sterilisation process is irradiation with ultraviolet light at 254 nm. Most preferably this occurs in a falling film irradiator.

The performance of the UV irradiator can be enhanced by using an emitter that also produces UV light at 185 nm as this inactivates microbial proteins used to repair damage caused to nucleic acids by irradiation at 254 nm. In this way all infectious agents found in the collected grey water, including those regarded as highly resistant to UV inactivation, are unable to reproduce. An enhanced radiator of this type can also be used to supply the small amount of air ozonation that may be beneficial in the aeration stage of the treatment process.

Recirculation of the waste water collected after an initial treatment in the recirculation vessel can continue the purification process, as the water undergoing treatment is resubjected to aeration, bubble separator and UV irradiation until essentially all detergents are removed. The water undergoing treatment can be recirculated as many times as deemed necessary for subsequent reuse.

The water undergoing treatment can be polished further by filtration processes such as passage over activated charcoal, micro filtration and ultra filtration. Most preferably an activated charcoal filter can be used to remove residual organic material remaining in the treated water.

The treated Water is transferred into a suitable storage vessel prior to reuse facilitated by a suitable pump. The storage of the treated water can be enhanced to minimise adventitious microbial activity by periodically exposing the inside of the storage vessel to UV radiation at 254 nm from an emitter suspended in the centre of the vessel.

Figure 1:
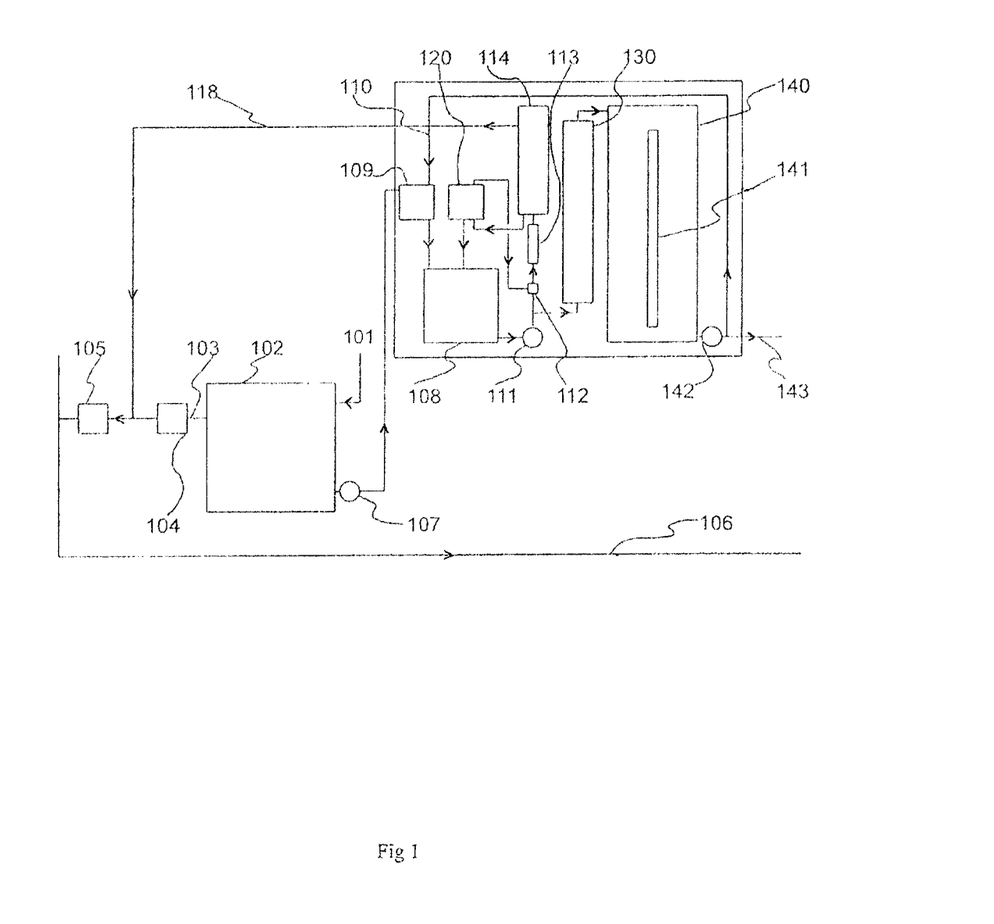
FIG. 1 shows a schematic of a preferred domestic grey water purification system according to the invention.

Turning now to the drawings, FIG. 1 depicts a preferred apparatus according to the present invention including: waste water inlet 101, sump 102, hack-flow prevention valve 104. U-trap 105, outlet to waste 106, pump 107, recirculation vessel 108, filter 109, venturi 112, static mixer 113, bubble separator 114, filter 130, storage vessel 140, emitter 141, pump 142, and outlet for water reuse 143.

In use, waste water from baths, showers and laundry (grey water) of a household is collected in a pit or sump 102. Waste from toilets, kitchen and floor wastes (black water) is directed to the sewer via conduit 106 without treatment. Plumbing is configured so that grey water in excess to the capacity of the treatment system continues to the sewer via pipe 103 once the sump 102 is full. The plumbing exiting the sump or pit 102 is configured to prevent black water from entering the pit or sump 102 from the sewer by use of a back-flow prevention valve 104 and malodorous gases from entering the pit or sump from the sewer by use of a U-trap 105.

Preferably treatment is performed in hatches so that the treatment apparatus is a convenient size for installation inside the dwelling. In the preferred embodiment batches of between 50-300 L are transferred from the collection pit 102 to the recirculation vessel 108. A pump 107 is used to transfer each hatch of grey water into the recirculation vessel 108. During this transfer it is preferable that the water is passed through a back-washable screen or titter 109, most preferably a parabolic wedge wire screen. This screen removes particulate matter such as hair, lint and sand. The performance of the screen 109 is most preferably maintained by periodic back-washing with a small amount of treated water via pipe 110.

Treatment begins when grey water is drawn from the base of the recirculation vessel 108 by means of a pump 111. The water then passes through a venturi 112 at a flow rate sufficient to draw gas, typically air, into the stream of water. The ratio of water volume to air volume is important to the optimal operation of the apparatus and preferably falls within the ratio of 30:1 and 5:1, water to air, including 25:1 and 5:1, 20:1 and 5:1, 15:1 and 5:1, 10:1 and 5:1, 30:1 and 10:1, 30:1 and 15:1, 30:1 and 20:1, 30:1 and 25:1, 25:1 and 10:1, and, 20:1 and 15:1. The best ratio will however depend upon the dimensions of the bubble separator, which are discussed in greater detail below.

The air entering the waste water forms bubbles which preferably are sheared into smaller bubbles most preferably by the use of a static mixer 113. According to the invention no further mixing of the waste water is necessarily required and the waster water exiting the static mixer and entering the bottom of the bubble separator 114 preferably has a non-turbulent smooth or laminar flow with uniform bubble distribution.

Figure 2:
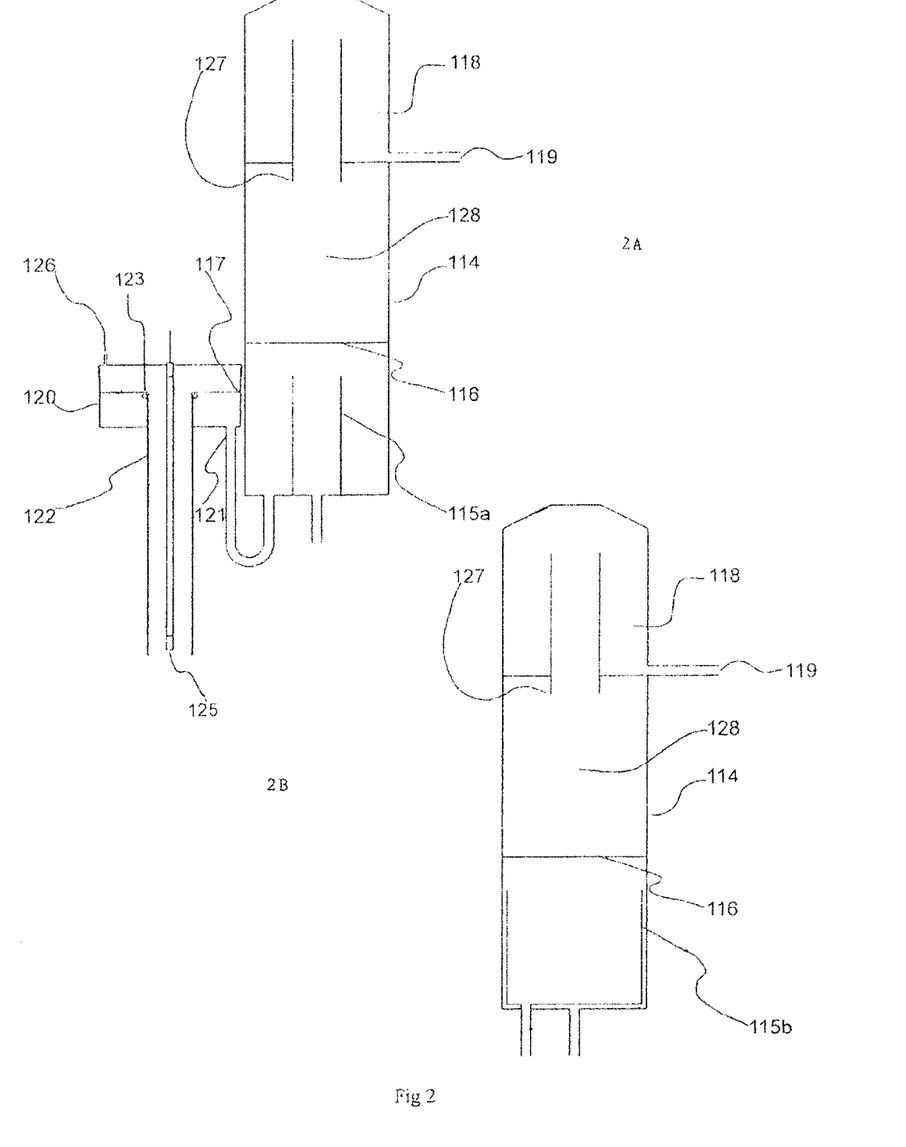
FIG. 2A shows a schematic of a design for a bubble separator with a central entry in combination with an ultraviolet sterilizer according to the invention.
FIG. 2B shows a schematic of a design for a bubble separator with a peripheral entry according to the invention.

The surfaces of the bubbles collect detergent molecules arranged so that their hydrophobic portions generally face the air inside the bubble and their hydrophilic portions generally face the body of water. Most surprisingly, it has been found that the surface of the bubbles also collect organic material and particulate in the grey water The geometry of the bubble separator is important in the efficient performance of the process in three respects. Firstly, the entry geometry ensures that bubbles are separated from the aerated waste water stream within the separator for efficient removal of contaminants and to avoid generation of foam in subsequent steps of the process. Secondly, the dimensions of the main body section set the upward velocity of the foam in the mid-body or drainage section and support the formation of a foam column in which excess water can drain downward, while contaminants are carried upward. Finally, the geometry at the ceiling and throat 127 (see FIG. 2) exiting the drainage section of the bubble separator is designed in such a way as to encourage recirculative motion in the foam to reduce the column height required to produce a dry foam.

With reference to FIGS. 2A and 2B, the aerated water is introduced to the bubble separator in such a way that the mixture travels rapidly upwards in a tubular or an annular section 115a/115b of small cross-sectional area before entering a section with a larger cross-sectional area. In this wider section the upward velocity of the water briefly drops to zero at a point 116 set by an overflow arranged outside the separator. Such an overflow arrangement is depicted in FIG. 2A at 117.

The ratio in volumetric flow rate of water to cross-sectional area sets the downward linear flow rate, which must be limited to ensure the smallest bubbles are allowed to rise buoyantly and not entrained. Preferably, the linear velocity will be between 0.2 and 2.0 cm/s. The water then descends. under gravity via the exit at the bottom of the bubble separator, while bubbles collect on the surface of the water. FIG. 2A depicts a suitable exit at 121.

The bubbles are then pushed upwards away from the body of water towards the top or ceiling of the bubble separator 114 by the arrival of more bubbles forming a foam. This foam carries the detergents upwards away from the hulk of the waste water. Most surprisingly it has been found that this foam also carries organic material and particles upwards away from the hulk of the waste water. The ratio of volumetric flow rate of air to cross-sectional area in this mid-body section of the separator sets the upward linear velocity of the foam body. Thus, for any particular rate of air introduction, there is an effective ratio of height-to-diameter that promotes stability and drainage of the foam column. If this ratio is too large, the foam will be unable to carry the entrained contaminants; too small and water will not be drained effectively, significantly increasing process waste. For a domestic-sized system, air flow rates are between about 1 and 20 l/min, preferably about between 1 and 10 l/min and most preferably between about 1 and 4 l/minute. This results in a preferable range of height-to-diameter ratios between 3:1 and 1:1.

By adjusting ceiling and throat geometries at the top of the drainage section 128, a preferred range of height-to-diameter ratios can be produced to facilitate packaging and installation in locations having limited space, such as domestic residences. The geometry of these features must be arranged in such a way that foam rising from point 116 at the side wall(s) of the drainage section 128 is redirected into the main or central body of the foam in a recirculative/drying motion which concentrates the foam. This recirculative motion is preferably achieved via the use of a throat on exit 127 which is of narrower diameter when compared to the drainage section 128. Preferably, the entry of the throat of exit 127 is positioned along the longitudinal axis of the bubble separator (i.e.: in the centre of the bubble separator 114), at or below the highest extent of the wall(s) of the drainage section 128.

A range of suitable ceiling/throat geometries for exit 127 is presented in FIGS. 3A to 3D. By controlling the throat-to-drainage section diameter ratio (preferably between 1:2 and 1:5) and ceiling geometry, the height-to-diameter ratio of the drainage section can be optimised. According to the invention a height-to-diameter value between 1:1 and 3:1 is preferred. Those skilled in the art based upon the teaching herein will be able to determine alternative geometric configurations for the ceiling/throat that will produce the required recirculative/drying motion and desired height-to-diameter ratio.

With reference to FIG. 3, Rt is the internal radius of the throat exit 127 and Rs is the internal radius of the drainage section 128 of the bubble separator 114. For example, FIG. 3A depicts a ceiling section of the drainage section 128 that slopes downwards from its highest. point towards throat exit 127. FIG. 3B depicts a horizontal ceiling section with a throat that protrudes downwards into the drainage section; FIG. 3C depicts a pitched ceiling section: and FIG. 3D depicts an arcuate ceiling surface. The skilled addressee will note that the ceiling geometries of FIG. 3 all act to direct at least some of the foam rising in the drainage section into the main or central body of the foam in a recirculative/drying motion.

FIGS. 2A and 2B depict two preferred arrangements for entry of waste water into the bubble separator and for the removal of foam. In this regard, FIG. 2A depicts a central conduit for the introduction of waste water and a central exit for foam. FIG. 2B depicts a peripheral entry for waste water and a central exit. According to the invention, the use of a peripheral entry has been found to be particularly advantageous in promoting the recirculation of foam in the drainage section. The person skilled in the art would recognise that other arrangements would be possible, including a peripheral entry for waste water and a peripheral exit for bubbles, and a central entry for waste water and a peripheral exit.

According to the invention, the geometric and flow considerations, including the diameter of the separator sections, the height of the drainage section, the shape of the separator exit, the rate at which air is injected, and the waste water flow rate are balanced such that most of the water drains out of the foam as it rises. As a result a largely "dry" foam remains at the top of the vessel where it enters a collector 118 (see FIG. 2A and 2B) and gradually collapses. The collapsed foam containing the detergents and attached organic material and particulate now enters the sewer via outlet 119 in a small amount of carried over water. Surprisingly less than 1% of the initial water is lost in the process.

As mentioned above, ozone can be introduced into the air stream to modify the properties of the bubbles and oxidise some of the malodorous compounds found in the grey water. However, for optimal performance of the invention it is important that this oxidising agent does not reach a concentration where degradation of the detergents can occur as they are necessary to the performance of the system.

Figure 4:
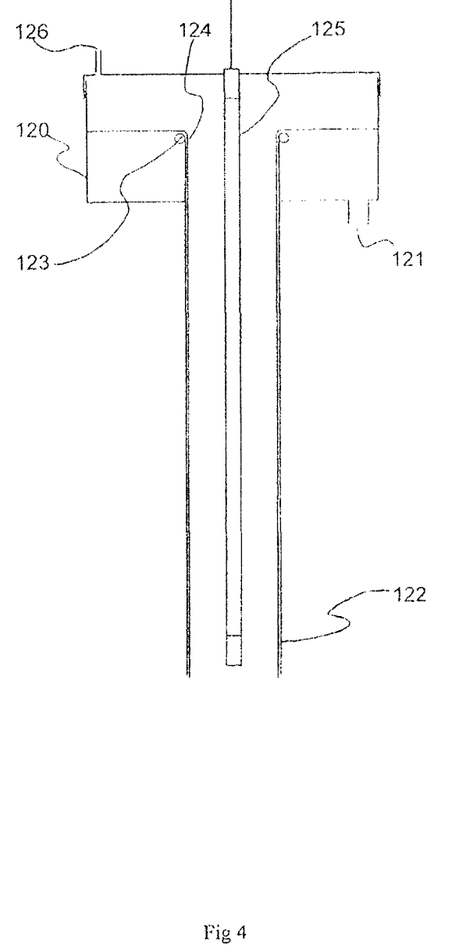
FIG. 4 shows a schematic of a falling film ultraviolet steriliser for use in combination with a bubble separator according to the invention.

With reference to FIG. 1, the water leaving the bubble separator 114 can fall directly hack into the recirculation tank 108 or more preferably is passed through a sterilisation process to ensure that all infectious agents are inactivated. The preferred sterilisation process is irradiation with ultraviolet light at 254 nm. Most preferably this occurs within a falling film irradiator 120 as depicted in FIGS. 2A and 4. In the preferred embodiment the treated water enters a cylindrical vessel from the bottom 121 and leaves through a pipe mounted in the centre of the vessel 122. This pipe has a smooth upper lip 123 made of a non corrosive. hydrophilic material, such as stainless steel, titanium or aluminium, so that the water can enter the internal wall of the pipe uniformly. The inside of the pipe is made up of a hydrophilic surface most preferably a highly polished, non corrosive, material such as aluminium, titanium or stainless steel. The water descends along this surface forming a thin film 124. Mounted in the centre of the pipe is a tubular UV emitter 125 arranged so that the waste water cannot come into contact with the surface of the emitter. In this way the emitter surface does not become fouled by material dissolved in the waste water and the dose of ultraviolet light received by the infectious agents found in the water is essentially independent of the optical properties of the water.

The performance of the UV irradiator can be most preferably enhanced by using an emitter 125 that also produces UV light at 185 nm as this inactivates microbial proteins used to repair damage caused to nucleic acids by irradiation at 254 nm. In this way all infectious agents found in the collected grey water, including those regarded as highly resistant to UV inactivation, are unable to reproduce. An enhanced radiator of this type can also be used to supply the small amount of air ozonation via inlet 126 and which has been found to be beneficial in the earlier stage of the treatment process.

Recirculation continues through the aeration, bubble separator and UV irradiation assemblies until essentially all detergents are removed. At this point the water is ready for reuse.

The water can be polished further by filtration processes such as passage over activated charcoal, micro filtration or ultra filtration. Most preferably the treated waste water is trickled through a bed of activated charcoal 130 to remove residual organic material not removed in the bubble separator.

With reference again to FIG. 1, the treated water is transferred into a suitable storage vessel 140 prior to reuse. The storage of the treated water can be enhanced to minimise adventitious microbial activity by periodically exposing the inside of the storage vessel to UV radiation at 254 nm from an emitter 141 suspended in the centre of the vessel. In a preferred embodiment a pump 142 supplies the treated water to the household plumbing 143 for reuse, for example in toilets, irrigation network and cold water supply to the laundry.

The invention claimed is:

1. A grey water bubble separator which includes:
a receptacle having a floor, an opposed ceiling and a side wall to define a separation chamber, the receptacle defining at least one inlet in the floor for aerated grey water containing bubbles, a first outlet for removal of water from the separation chamber after separation of the bubbles from the water; and
a throat-defining member defining a second outlet for removal of separated bubbles from the separation chamber and having at least a portion projecting through the ceiling into the separation chamber,
wherein the receptacle and the throat-defining member form a bubble reflector, the bubble reflector comprising the ceiling of the receptacle and that portion of the throat-defining member projecting into the separation chamber,
wherein the second outlet is arranged closer than the ceiling to the at least one inlet, the bubble reflector defining a shape which in cross-section is configured to promote recirculating flow of a foam column constituted by the separated bubbles to reduce a column height required to produce a dry foam.

2. The bubble separator of claim 1 in which the first outlet is also arranged in the floor of the receptacle, the first outlet and the at least one inlet being separated by a separating wall, the separating wall defining an in-flow zone into the separation chamber having a cross-sectional area less than that of a cross-sectional area of the separation chamber of the receptacle.

3. The bubble separator of claim 2 in which the in-flow zone is annular, the in-flow zone being defined between the separating wall and the side wall of the receptacle.

4. The bubble separator of claim 1 which further includes a foam collector arranged on the receptacle, the foam collector defining a foam collection chamber in communication with the separation chamber of the receptacle via the throat-defining member, the foam collector defining a third outlet via which foam collected in the collector is discharged.

5. The bubble separator of claim 1 in which the bubble reflector defines a shape which in cross-section is selected from the group consisting of: pitched, arcuate, angled and combinations thereof.

6. The bubble separator of claim 1 in which a ratio of a diameter of the separation chamber to a diameter of the throat-defining member is in a range of about 2:1 to about 5:1.

7. The bubble separator of claim 1 in which a height to diameter ratio of the separation chamber is in a range of about 1:1 and 3:1.

8. An apparatus for treating waste water containing surfactant impurities including the bubble separator as claimed in claim 1, the apparatus further including:
a gas injection device to inject gas into the waste water to be treated; and
a mixing device arranged downstream of the gas injection device;
wherein the at least one inlet of the receptacle of the bubble separator is connected to an outlet of the mixing device.

9. The apparatus of claim 8 which further includes an irradiator connected to the first outlet of the receptacle of the bubble separator, the irradiator performing a sterilisation process on the water discharged from the bubble separator.

10. The apparatus of claim 9 which includes a reservoir arranged upstream of the gas injection device for enabling waste water to be treated in a batch process and which further includes a filter interposed between the reservoir and the gas injection device.

11. The apparatus of claim 10 which includes a recirculation tank arranged intermediate the filter and the gas injection device to facilitate recirculating treatment of the waste water.

12. The apparatus of claim 8 in which the gas injection device is a venturi.

13. The apparatus of claim 12 in which the venturi is configured to entrain gas bubbles in the waste water in a volumetric ratio in a range of about 1:5 to 1:30.

14. The apparatus of claim 8 in which the mixing device is a static mixer configured to shear gas bubbles entrained in the waste water into smaller, substantially uniformly sized bubbles, the static mixer further being configured to promote laminar flow of aerated waste water output from the static mixer.

15. The apparatus of claim 8 which includes a storage tank, downstream of the bubble separator in which treated water is stored for subsequent use, an emitter being arranged in the storage tank to, at least periodically, irradiate an interior of the storage tank.

16. A process for treating waste water containing surfactant impurities with the bubble separator as claimed in claim 1, the process including:
injecting gas into the waste water to form aerated waste water containing bubbles;
introducing the aerated waste water into the bubble separator;
separating the bubbles and any contaminants carried by the bubbles from the water; and
subjecting the water, after separation of the bubbles, to further treatment.

17. The process of claim 16 in which subjecting the water to further treatment includes irradiating the waste water.

18. The process of claim 16 which includes recirculating treated water to be subjected to further processing prior to being stored for re-use.

19. The process of claim 16 which includes, after injecting gas into the waste water, shearing the aerated waste water to form gas bubbles of a substantially uniform size and to impart substantially laminar flow to the waste water prior to introduction of the waste water into the bubble separator.

20. The process of claim 16 which includes, initially, storing the waste water to be treated in a reservoir to enable treatment to occur in a batch process and filtering the waste water extracted from the reservoir prior to injecting gas into the waste water.

\* \* \* \* \*